United States Patent [19]

Atkinson, III

[11] Patent Number: 4,477,095

[45] Date of Patent: Oct. 16, 1984

[54] COLLET ADAPTER

[75] Inventor: Joseph W. Atkinson, III, Horseheads, N.Y.

[73] Assignee: Hardinge Brothers, Inc., Elmira, N.Y.

[21] Appl. No.: 451,776

[22] Filed: Dec. 21, 1982

Related U.S. Application Data

[63] Continuation-in-part of Ser. No. 281,098, Jul. 7, 1981, abandoned.

[51] Int. Cl.³ ............................................. B23B 31/20
[52] U.S. Cl. ..................................... 279/1 A; 279/52
[58] Field of Search .................. 279/1 A, 1 R, 46 R, 279/51, 52, 53; 408/239, 239 A, 240

[56] References Cited

U.S. PATENT DOCUMENTS

| | | | |
|---|---|---|---|
| 2,376,594 | 5/1945 | Hite | 279/46 |
| 2,478,195 | 8/1949 | Hull | 279/1 R |

Primary Examiner—Z. R. Bilinsky
Assistant Examiner—Daniel W. Howell
Attorney, Agent, or Firm—Shlesinger, Arkwright, Garvey & Fado

[57] ABSTRACT

A collet adapter enabling use of a smaller collet in a larger spindle, the adapter comprising a reducer bushing externally configured so as to fit within the spindle and an internal configuration such as to receive the collet, the reducer bushing having an annular recess near the innermost end thereof, a draw tube adapted to engage a collet and positioned at least partially within the reducer bushing, the draw tube including a radial flange extending into the recess and spring means positioned in the recess around the draw tube for urging the draw tube axially forwardly in the reducer bushing, the draw tube axially forwardly in the reducer bushing, and means for connecting the draw tube for urging the draw tube axially forwardly in the reducer bushing, and means for connecting the draw tube to a collet actuating device.

15 Claims, 6 Drawing Figures

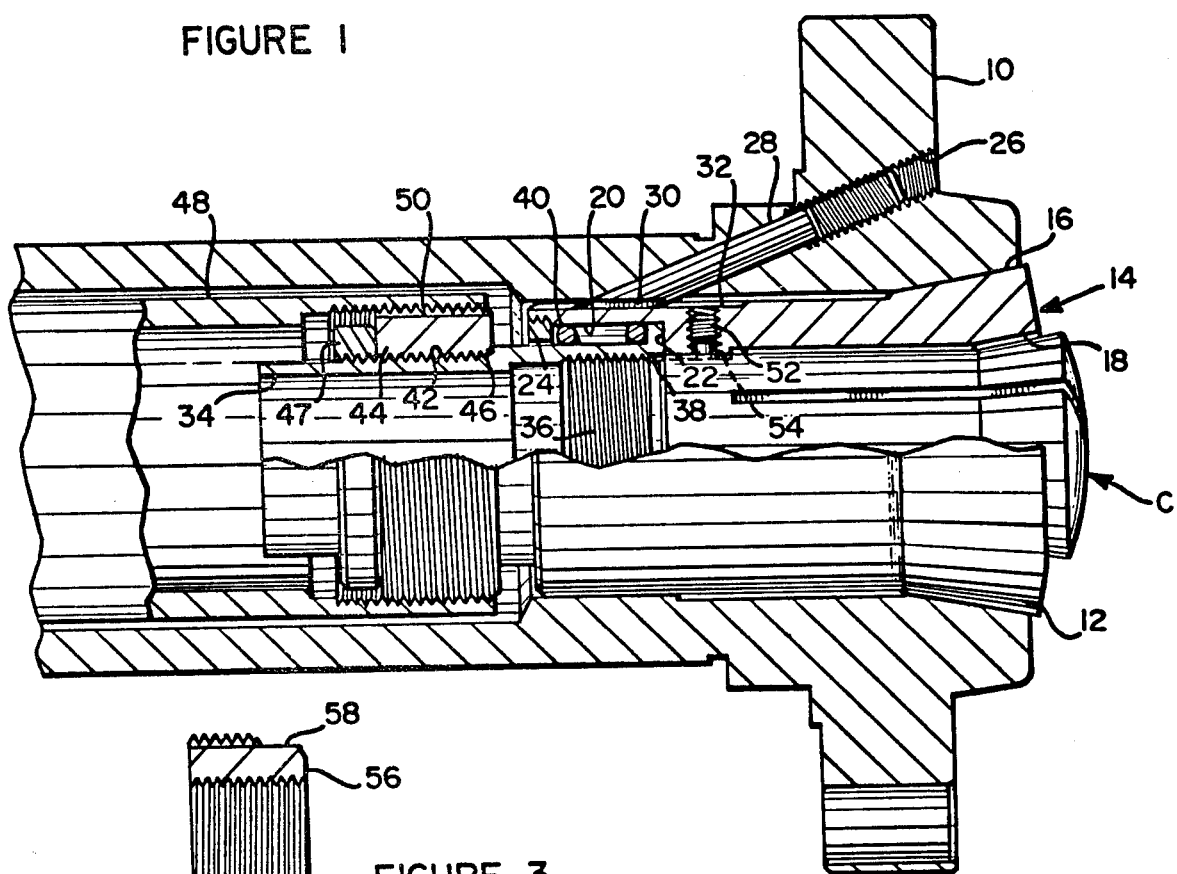
FIGURE 1
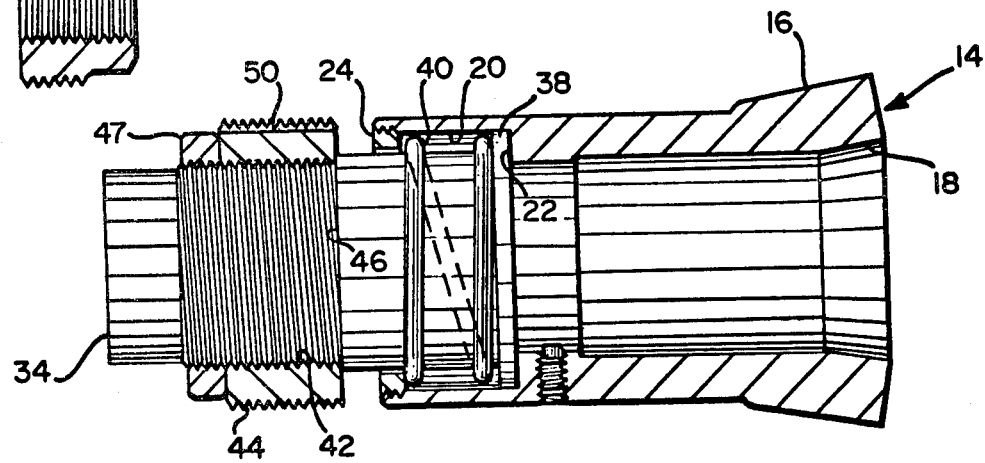
FIGURE 3
FIGURE 2

COLLET ADAPTER

RELATED APPLICATION DATA

This is a continuation-in-part of application Ser. No. 281,098, filed July 7, 1981, abandoned.

This invention relates to a collet adapter, and in particular an adapter for use with a machine tool which is designed to accept a specific size collet, wherein the user wishes to use a smaller collet of lesser capacity.

BACKGROUND AND OBJECTS

In the machine tool industry, machines such as lathes, chucking machines, and the like are available with a significant variety of spindle sizes and capacity. The spindle sizes available depend to some extent upon the manufacturer of the machine as well as the type of work which it is intended to handle. A number of different so called "standard" size spindles are used.

For example, a "5C" is a rather common size collet/spindle for a number of different machines. Another larger spindle is the American National Standard Institute (ANSI) "A2-5" spindle which may be made to accept the larger 16C collets, which in turn accept larger diameter work. Many machine shops like to have the capability of using the larger 16C collets, but also need the smaller 5C collets. Such machine shops may have only an occasional need for the larger capacity of the 16C collets, and may have a larger inventory of 5C collets for work up to 1-1/16 inch round. Thus, the adapter of the present invention permits use of the smaller collets on the larger size spindle machines.

In addition, conventional spindle tooling such as live centers, expanding collets, etc. which have the external configuration of the smaller collet could also be used with the adapter and the smaller size collet.

The prior art reveals an adapter also intended for adapting a smaller collet to a large spindle. U.S. Pat. No. 2,478,195 discloses such an adapter which includes a tapered head portion slideably engaged with a threaded tubular portion. The tubular portion in turn threadedly engages the draw tube of the machine tool on its exterior surface and threadedly receives the smaller diameter on its interior surface. However this prior structure suffers from several disadvantages. Specifically, upon release of the draw tube for releasing the work, there is no positive release of the collet. Instead of pushing the collet out of the head portion, to release the work, the adapter is just as likely to push its head portion out of the spindle while retaining full gripping pressure on the workpiece. In addition, the connection between the head portion and the tubular portion of this adapter is such that significant wear can result between the two pieces which in turn can reduce the accuracy of the machine tool.

Accordingly, it is a primary object of the present invention to provide an improved adapter for adapting a collet of a given size to a larger size machine tool spindle.

Another object of the invention is to provide a collet adapter which is spring biased into the spindle even when the collet is released.

A further object of the invention is to provide a collet adapter of improved construction.

An additional object of the disclosed invention is to provide an adapter cap for preventing shifting of the bushing should the collet become jammed thereon thus providing at all times positive release of the collet from the bushing.

Yet another object of the disclosed invention is to provide an adapter cap having seal means for sealing the cap to the reducer bushing to prevent the entrance of dirt and contaminants into the bushing assembly.

Still a further object of the disclosed invention is to provide an adapter cap which has an aperture sized to accept all sizes of collets.

These and other objects and advantages of this invention will become apparent when considered in light of the following description and claims when taken together with the accompanying drawings.

DESCRIPTION OF THE DRAWINGS

FIG. 1 is a longitudinal cross section of the collet adapter of this invention mounted within a spindle;

FIG. 2 is a longitudinal cross section of the collet adapter of the present invention;

FIG. 3 is a longitudinal cross sectional view of a modified form of an adapter bushing;

DESCRIPTION OF THE INVENTION

Figure 4:
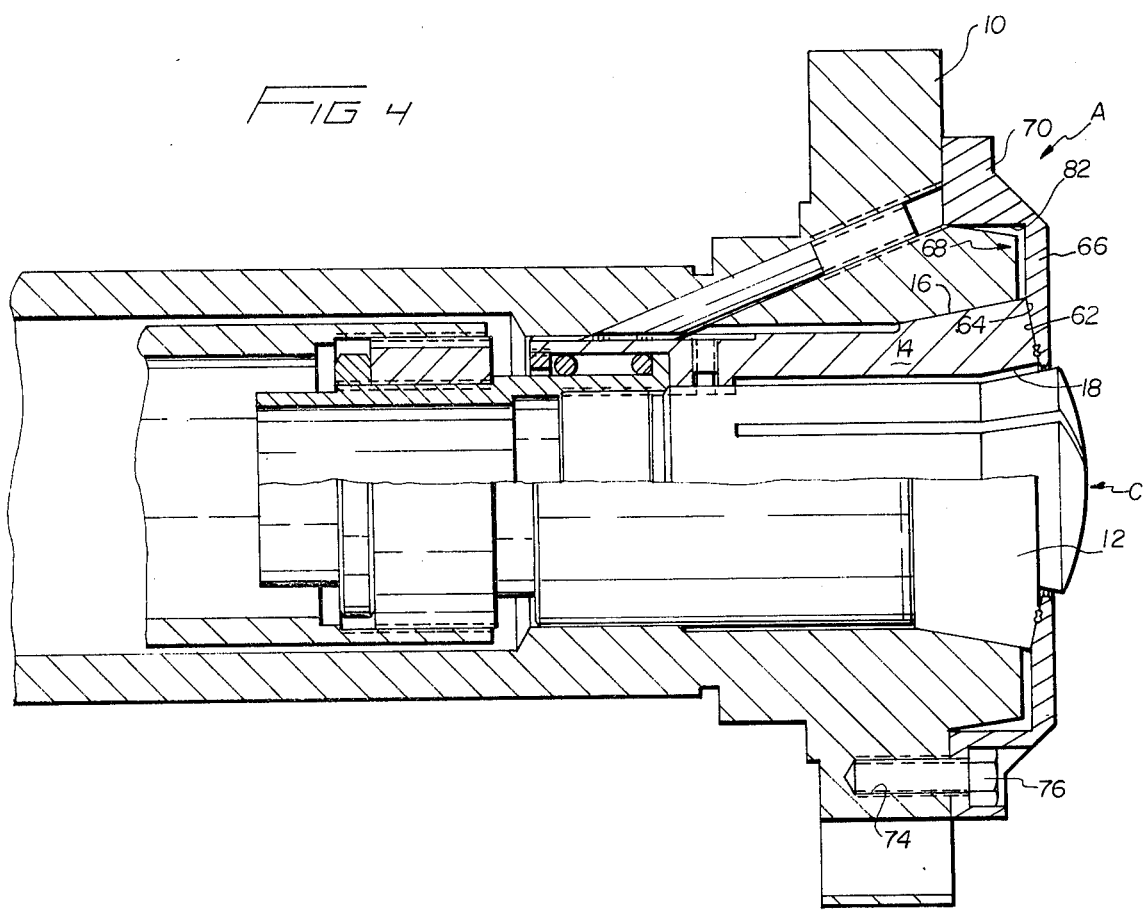
FIG. 4 is a longitudinal cross sectional view of another embodiment of the invention and disclosing an adapter cap mounted on the spindle.

Referring to FIG. 1, a machine tool spindle 10 is provided of substantially conventional construction, and as such includes the usual tapered camming surface 12. A reducer bushing 14 is inserted within the spindle and includes an outer tapered surface 16 at the same angle as the surface 12, and an inner tapered surface 18 which is at the same angle as the smaller size collet C being used.

The reducer bushing 14 has its inner end a portion 20 of an enlarged internal diameter having a shoulder 22 at one end and threaded at the innermost end so as to receive a retaining nut 24 as shown or other retainer such as a snap ring.

The spindle 10 is drilled and tapped at 26 so as to receive a key screw 28 of conventional configuration. The key screw 28 has a projecting key tang 30 which is engageable with a keyway 32 formed in the adapter bushing 14.

A draw tube 34 is provided and includes internal threads 36 engageable with the standard threads on the collet C, and also includes at its forward end an outwardly turned flange 38. A coil spring 40 is provided in the space between the flange 38 and the lock nut 24, and is held in place by the lock nut or retainer 24. Thus the coil spring 40 serves to urge the flange 38 of the draw tube 34 against the shoulder 22 of the reducer bushing 14, as best shown in FIG. 1, thus urging the attached collet C out of the reducer bushing 14 to effect a positive release of the work in the collet.

The draw tube 34 is externally threaded as at 42 so as to threadedly receive an adapter bushing 44 against shoulder 46. The adapter bushing 44 is secured in this position against the shoulder 46 by means of lock nut 47 which is tightened against the bushing 44. The bushing 44 is externally threaded so as to engage the draw spindle 48 of a conventional collet actuating mechanism (not shown). In addition, the bushing 44 is provided with a keyway 50 so positioned as to be in axial alignment with keyway 32 when the bushing is tightened against the shoulder 46. In some cases, due to normal wear or play of the adapter bushing 44, when the bushing engages the shoulder 46, the keyways 50 and 32 may not be in alignment. In some cases, the bushing 44 may be backed off slightly until the keyways are in alignment, whereupon tightening of the lock nut 47 will hold the alignment.

A key screw 52 is provided in the reducer bushing 14 so as to engage keyway 54 in the collet C, and prevent relative rotation of the collet C within the bushing 14.

To assemble the reduced size colelt within the adapter and the machine tool spindle, with all parts disassembled the draw tube 34 with the spring 40 in place around the draw tube 34 is inserted into the recess 20 of the reducer bushing 14, and secured by the lock nut or retainer 24. The collet C is then inserted into the reducer bushing 14 and threaded fully into the draw tube 34. The collet C is rotated within the reducer bushing 14 until the keyway 54 aligns with the key screw 52, to prevent relative rotation of the collet C and the reducer bushing 14. Next, the adapter bushing 44 is threaded fully onto the draw tube 34 as so to abut the shoulder 46, and is adjusted and secured in place by the lock nut 47 as described above. At this point, the keyway 50 should be axially aligned with the keyway 32.

The key screw 28 is inserted into the spindle to the extent that the tang 30 projects slightly beyond the inside wall of the spindle 10. The reducer bushing 14 with the assembled draw tube 34 and collet C and adapter bushing 44 are then inserted into the spindle 10 as the tang 30 passes through the keyways 50 and 32. The draw spindle 48 is then rotated into threaded engagement with the adapter bushing 44, and the assembly is then adjusted according to normal procedures for use.

Alternatively, FIG. 3 shows an adapter bushing 56 similar to bushing 44, but wherein the threads are cut a way as at 58, so that after the bushing is inserted into the spindle, and the keyway on the bushing 56 has passed the projecting tang 30, the assembly may be rotated slightly to the extent that the tang 30 will be aligned with and engage the keyway 32. In this case, it is not necessary that the two keyways be in axial alignment.

It will be seen from the foregoing description that when the collet actuator is activated so as to close the collet C by drawing it into the reducer bushing 14, spring 40 will be compressed as the shoulder 38 moves to the left as best seen in FIG. 1. In this manner, the reducer bushing 14 is urged into the spindle 10 by the spring force until the collet C engages the surface 18 of the bushing 14 whereupon the collet is closed onto the workpiece. Likewise, when the collet actuator is activated so as to release the work by moving the collet C to the right as best shown in FIG. 1, the spring tension continues to urge the bushing 14 into the spindle 10 as the collet C is moved to the right, i.e. to the open position. In this manner, a positive release of the work in the collet is achieved and the reducer bushing 14 is retained firmly seated in the spindle 10 to maintain accuracy, keep dirt, chips and coolant out of the spindle and reduce wear on the spindle.

Figure 5:
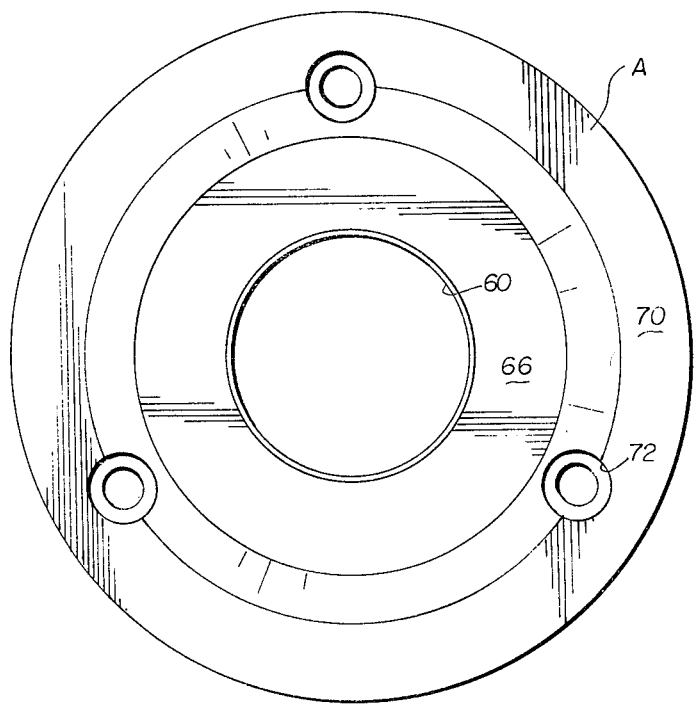
FIG. 5 is a right end elevational view of the adapter cap of FIG. 4.

As best shown in FIG. 4, an adapter cap or bushing retaining cap means A may be coaxially mounted on spindle 10. Cap A has a sized aperture 60 co-axial with spindle 10. Aperture 60 is sized so that collet C is free to longitudinally move through aperture 60 so that the collet C may grasp or release the work piece (not shown). Cap A has a sloped inner surface 62 which is sloped to conform to the slope on the outer surface 64 of bushing 14. In this way, the sloped surface 62 of cap A rests against the outer surface 64 of bushing 14. Cap A has a radially extending member 66 which extends beyond the shoulder 68 of spindle 10. A radially extending flange piece 70 extends from member 66 and abuts spindle 10. Cap A, as best shown in FIG. 5, has a number of apertures 72 located in flange 70. Cooperating threaded apertures 74 are located in spindle 10. Bolts 76 are inserted in apertures 72 and 74 for detachably fastening cap A to spindle 10. In this way, by removing bolts 76 Cap A may be removed from spindle 10 so that bushing 14 may be replaced. It should be noted that cap A does not have to be changed when bushing 14 is changed as aperture 60 is sized independent of the size of bushing 14.

Figure 6:
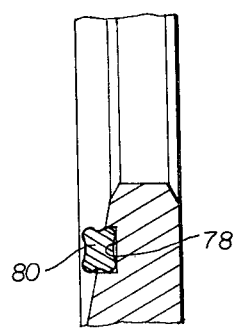
FIG. 6 is an enlarged fragmentary cross sectional view of the adapter cap of FIG. 4 and disclosing seal means mounted in a retaining ring.

As best shown in FIG. 6, an annular, spaced, radial groove 78 surrounds aperture 60. Groove 78 is co-axial with collet C. A quad-ring, or O-ring, or other resilient, flexible sealing means 80 is inserted in groove 78 when Cap A is mounted on spindle 10 to prevent the entrance of dirt or other contaminants into the collet mechanism. Particulary to be avoided, is the accumulation of dirt or other contaminants in chamber 82 located between shoulder 68 and members 70 and 66.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. A device for adapting a collet to an oversized spindle on a machine tool, comprising:
   (a) a generally tubular reducer bushing having an external configuration sized to fit with said oversized spindle and an internal configuration sized to receive a collet, said tubular reducer bushing having a forward end and a rearward end;
   (b) said tubular reducer bushing having an annular recess projecting forwardly from said tubular bushing rearward end and said recess having forward and rearward axial ends;
   (c) said forward axial end having an interior annular shoulder;
   (d) said rearward axial end having interior retaining member securing means;
   (e) a removable interior retaining member engaging said interior retaining member securing means and forming the rearward axial end of said annular recess;
   (f) a draw tube having means for engaging a collet and being positioned at least partially within said reducer bushing, said draw tube including a radial projection extending into said recess;
   (g) removable spring means positioned in said recess between said radial projection and said removable retaining member for urging said draw tube axially forwardly in said reducer bushing; and,
   (h) means for connecting said draw tube to a collet actuating device.

2. A device as in claim 1, wherein:
(a) said spring means includes a coil spring surrounding said draw tube.
3. A device as in claim 1, wherein:
(a) said retainer member comprises a retainer nut threadedly engaging said reducer bushing.
4. A device as in claim 3, wherein:
(a) said radical projection comprises a radially outwardly directed flange.
5. A device as in claim 1, wherein:
(a) said connecting means comprises a threaded rear portion on said draw tube; and,
(b) an adapter bushing threadedly engaging said rear portion of said draw tube.
6. A device as in claim 5, wherein:
(a) said adapter bushing connects to a draw spindle of a collet actuating device.
7. A device as in claim 6, further comprising:
(a) a lock nut for securing said adapter bushing on said draw tube.
8. A device as in claim 5, further comprising:
(a) key means for preventing relative rotation of said reducer bushing in said spindle.
9. A device as in claim 8, wherein:
(a) said key means includes keyways formed in the exterior surface of said reducer bushing; and,
(b) said adapter bushing and a key member project from the interior of said spindle so as to progressively engage the keyway in said adapter bushing and the keyway in said reducer bushing as the device is inserted into said spindle.
10. A device as in claim 8, wherein:
(a) said keyways are axially aligned.
11. A device as in claim 8, wherein:
(a) said keyways are axially spaced a distance greater then the axial length of said key member so that the device may be rotated within a spindle when said device is inserted in the spindle to the extent that said key member has passed through the keyway in said adapter bushing and before said key member enters the keyway in said reducer bushing.
12. A device as in claim 10, wherein:
(a) said adapter bushing is threaded along substantially its entire axial outer surface.
13. A device as in claim 1, further comprising:
(a) bushing retaining means detachably mounted to said spindle and including a sized aperture co-axial with said collet for retaining said bushing and permitting free movement of said collet.
14. A device as in claim 13, wherein:
(a) said bushing retaining mean includes an annular retaining ring;
(b) said ring having an inner surface sloped to cooperate with said bushing outer surface;
(c) said ring having a radially extending flange for mounting said ring to said spindle; and,
(d) means for detachably attaching said ring to said spindle.
15. A device as in claim 14, wherein:
(a) said ring inner surface including a radially spaced annular groove co-axial with said collet; and,
(b) seal means inserted in said grooves for sealing said bushing and said retaining ring.

* * * * *